Dec. 2, 1969 W. J. THOMPSON 3,482,247
INSTRUMENT LANDING SYSTEM
Filed July 24, 1968 4 Sheets-Sheet 1
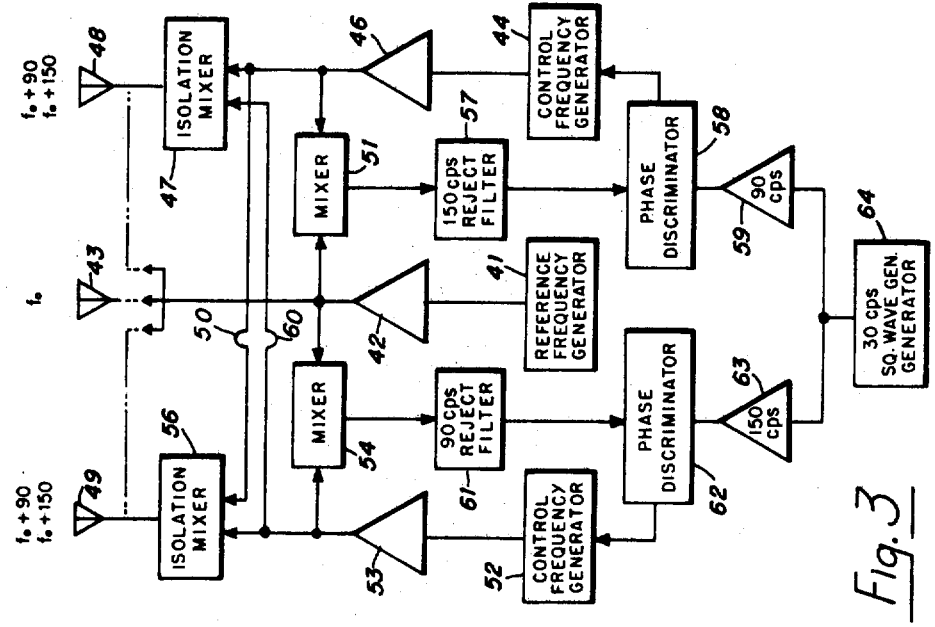
Fig. 3
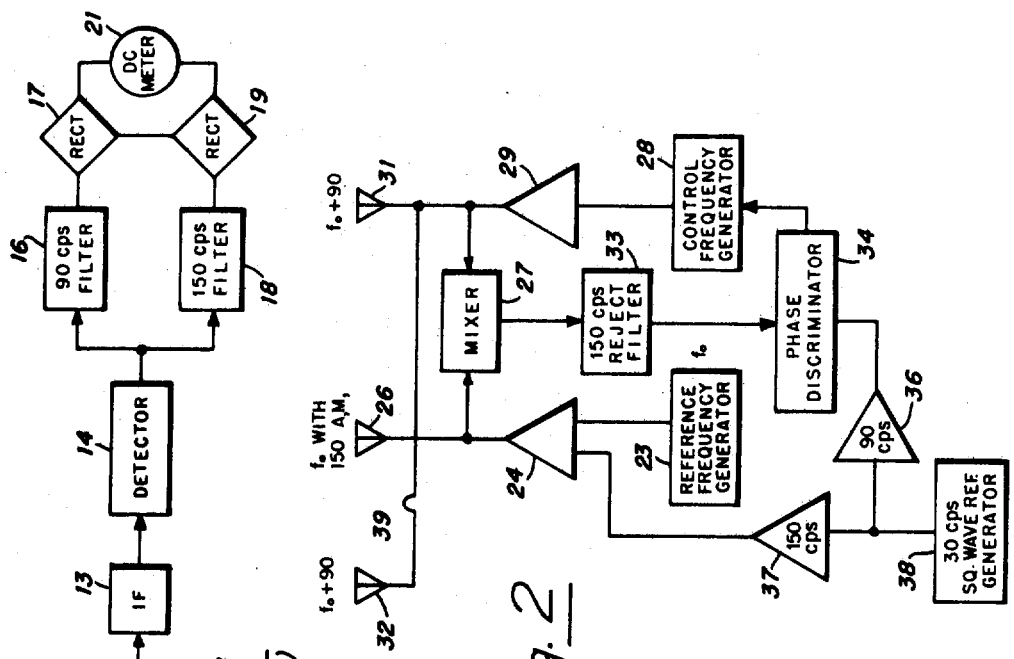
Fig. 1 (PRIOR ART)
Fig. 2
INVENTOR.
WILLIAM J. THOMPSON
BY
Richard L. MacNeill INVENTOR.
WILLIAM J. THOMPSON
BY
Richard K. MacNeill INVENTOR.
WILLIAM J. THOMPSON
BY
Richard K. MacNeill

United States Patent Office 3,482,247
Patented Dec. 2, 1969

3,482,247
INSTRUMENT LANDING SYSTEM
William J. Thompson, San Diego, Calif., assignor to Cubic Industries Corporation, San Diego, Calif., a corporation of California
Continuation-in-part of application Ser. No. 631,110, Mar. 20, 1967. This application July 24, 1968, Ser. No. 752,126
Int. Cl. G01s 1/16, 1/18
U.S. Cl. 343—108    8 Claims

ABSTRACT OF THE DISCLOSURE

An Instrument Landing System for utilization in conjunction with conventional navigation receiving equipment commonly present in aircraft known as an ILS receiver which radiates at least two signals from a first antenna differing in frequency from a carrier frequency by first and second channel frequencies and at least two signals from a second antenna spatially disposed from the first antenna, the signals also differing in frequency from a carrier frequency by the frequency of first and second channels and being in a fixed phase relationship with the signals radiated from the first antenna and a third signal being radiated at the carrier frequency only.

Related applications

This application is a continuation-in-part of my copending application filed Mar. 20, 1967, Ser. No. 631,110, for Instrument Landing System, now abandoned.

Background of the invention

The present invention relates to an instrument landing system and more particularly to an instrument landing system utilizing relative phase of received carriers in existing aircraft receiving equipment.

Prior art difficulties in instrument landing systems have resulted in main from the necessity of determining with extreme precision the amplitude of radiation patterns from a plurality of antennas. This has resulted in extremely costly and difficult installation problems because of variations in weather, terrain, etc., which, in turn, will vary radiation patterns with time and azimuth orientation, resulting in an inaccurate indication of position of the runway as seen by the aircraft. Indeed, in some instances, the antenna radiation pattern type of landing systems have not been possible due to these inherent inaccuracies. A further disadvantage was the necessity for special receiving equipment to accommodate the transmitting equipment in some cases which not only resulted in added expense in the aircraft equipment, but in adding more equipment to an already overcrowded instrument panel.

The utilization of a normal localizer section of a navigation receiver requires that the intelligence be presented through two channels of the receiver, i.e., a 90 c.p.s. channel and a 150 c.p.s. channel, the outputs of which are rectified and applied across a differential DC meter.

In one embodiment of the present invention, a system of three antennas in spatial relationship is utilized, one of which transmits a reference carrier frequency and the other two transmit a carrier frequency 90 c.p.s. removed from the reference frequency. At the aircraft, the reference frequency is combined with each of the two signals 90 c.p.s. removed therefrom to result in two 90 c.p.s. signals, their combined resultant having an amplitude dependent upon the phase relationship between the two 90 c.p.s. offset signals as they are received by the aircraft antenna. The 90 c.p.s. output of the detector of the receiver will then have an amplitude dependent upon the phase relationship of these signals which will result in a meter deflection through the 90 c.p.s. channel proportional to this phase relationship. At the same time, the reference carrier can be amplitude modulated by 150 c.p.s. signal which can be utilized through the 150 c.p.s. channel in the receiver as a reference level for calibration of the system. Hence, the meter deflection at the output of the receiver can be calibrated in terms of vertical and horizontal direction to the runway depending upon the physical disposition of the transmitting antennas.

In a second embodiment of the present invention, a reference carrier is unmodulated and each of two antennas in spatial relationship transmit two carrier frequencies, one 90 c.p.s. removed from the reference carrier and the other 150 c.p.s. removed from the reference carrier. The reference carrier may be transmitted from a third reference antenna or, by duplexing, through either of the other two antennas. The output of the detector of the navigation receiver will then have a 150 c.p.s. signal and a 90 c.p.s. signal, the amplitudes of each being determined by the relative phases of the respective offset signal pairs as they are received by the aircraft antenna. These are applied to the output meter through the respective 90 and 150 c.p.s. channels of the navigation receiver resulting in deflection of the meter which again is dependent upon the relative phases of the incoming carrier signals. This, again, can be calibrated in terms of glide slope or azimuth depending upon the physical disposition of the transmitting antennas.

In a further embodiment, each of the two antennas in spatial relationships transmit two carrier frequency pairs, one pair 90 c.p.s. above and below the reference frequency (as 90 c.p.s. sidebands with suppressed reference carrier) and the other pair 150 c.p.s. above and below the reference frequency (as 150 c.p.s. sidebands with suppressed reference carrier). Again, the reference carrier may be transmitted from a third reference antenna or, by duplexing, through either of the other two antennas.

The output of the detector of the navigation receiver in the aircraft will then have a 90 c.p.s. signal and a 150 c.p.s. signal, the amplitudes of each being determined by the phase relationships between the respective upper and lower sideband pairs as they are received by the aircraft antenna. These are applied to the output meter through the respective 90 and 150 c.p.s. channels of the navigation receiver resulting in deflection of the meter which again is dependent upon the relative phases of the incoming carrier signals. This, again, can be calibrated in terms of glide slope or azimuth depending upon the physical disposition of the transmitting antennas.

A further embodiment of the present invention utilizes wo transmitting antennas in spatial relationship, one transmitting a reference frequency carrier and the other transmitting two carriers, one removed by 90 c.p.s. and the other removed by 150 c.p.s. from the reference carrier frequency. In this embodiment, the reference carrier frequency is amplitude modulated by both the 90 and 150 cycle separation frequencies, resulting in outputs from the detector of two 90 c.p.s. signals, one derived from the mixing of the 90 c.p.s. offset carrier with the reference and the other derived from the 90 c.p.s. amplitude modulated reference, and two 150 c.p.s. signals similarly derived. The two 90 c.p.s. signals combined to provide a resultant 90 c.p.s. signal whose amplitude is dependent upon the relative phase between the 90 c.p.s. carrier and the reference carrier at the navigation receiver's antenna. The two 150 c.p.s. signals similarly combine to produce a resultant 150 c.p.s. signal whose amplitude is dependent upon the relative phase between the 150 c.p.s. offset carrier and the reference carrier at the navigation receiver's antenna. These are applied to the output meter through the respective 90 and 150 c.p.s. channels of the navigation receiver resulting in deflection of the meter which again is dependent upon the relative phases of the incoming carrier signals. This, again, can be calibrated in terms of glide slope or azimuth depending upon the physical disposition of the transmitting antennas.

As can be seen from the above descriptions, each of the embodiments of the invention depend upon phase relationships and in utilizing a non-lobing transmitting system for determining runway position from the receiving aircraft.

An object of the present invention is the provision of an instrument landing system utilizing existing navigation receivers.

Another object is to provide an instrument landing system which relies solely on the relative phase of a plurality of received signals at the aircraft to determine direction to the runway.

A further object of the invention is the provision of an instrument landing system which is simple and inexpensive to install.

Still another object of the invention is the provision of an instrument landing system which is extremely reliable and requires a minimum of maintenance, adjustment and calibration.

Yet another object of the invention is the provision of an instrument landing system in which the effects of weather and terrain variation on overall accuracy will be minimized.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a block diagram of a conventional ILS receiver;

FIG. 2 is a block diagram of one embodiment of the present invention;

FIG. 3 is a block diagram of another embodiment of the present invention;

Figure 5:
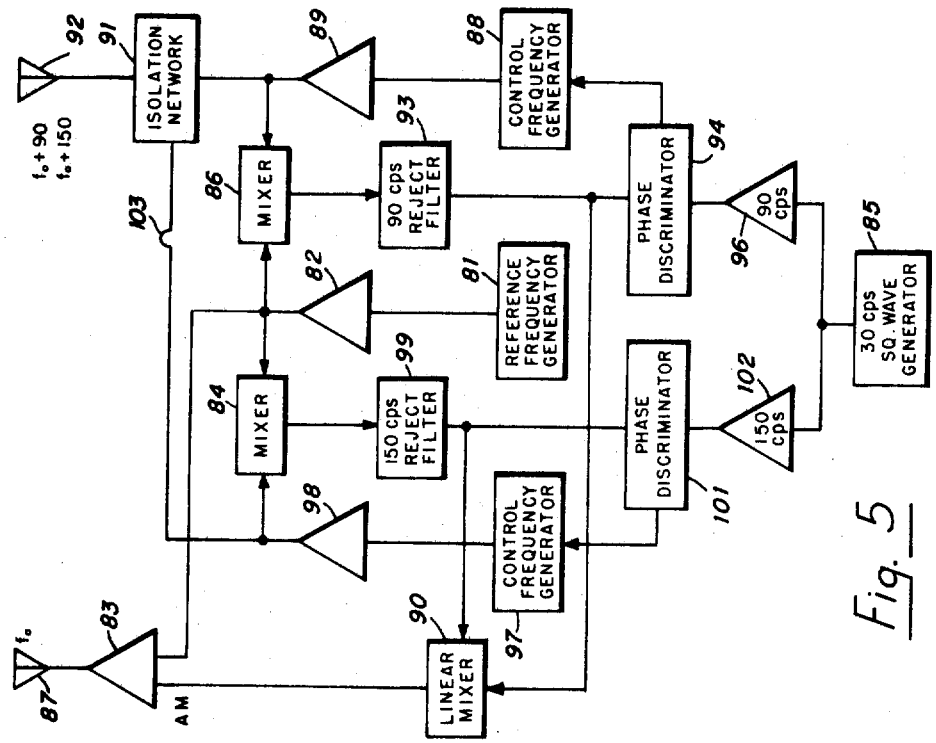
FIG. 5 is a block diagram of yet another embodiment of the present invention.

Referring to FIG. 1, receiving antenna 11 is coupled to converter 12 which, in turn, is coupled through IF strip 13 to detector 14. One output of detector 14 is connected through a 90 c.p.s. filter 16 to rectifier 17. Another output of detector 14 is coupled through 150 c.p.s. filter 18 to rectifier 19. The outputs of rectifiers 17 and 19 are connected across differential DC meter 18.

Referring to FIG. 2, reference frequency generator 23 is connected through amplifier 24 to transmitting antenna 26 and to one input of mixer 27. Controlled frequency generator 28 is connected through amplifier 29 to transmitting antenna 31, through phase delay 39 to antenna 32 and to another input of mixer 27. The output of mixer 27 is connected through 150 c.p.s. rejection filter 33 to one input of phase discriminator 34. Thirty c.p.s. square wave reference generator 38 is connected to 90 c.p.s. amplifier 36 and 150 c.p.s. amplifier 37 which extract the third and fifth harmonics of the 30 c.p.s. square wave to provide 90 c.p.s. and 150 c.p.s. sine waves of fixed relationship. Ninety c.p.s. amplifier is connected to another input of phase discriminator 34, the output of which is connected to a control input of control frequency generator 28. One hundred fifty c.p.s. amplifier is connected to an amplitude modulation input of amplifier 24.

Referring to FIG. 3, reference frequency generator 41 is connected through amplifier 42 to transmitting antenna 43 or alternately duplexed to either antenna 48 or antenna 49. Control frequency generator 44 is connected through amplifier 46 and isolation network 47 to transmitting antenna 48 and through phase delay 60 to transmitting antenna 49. The output of amplifier 46 is also connected to one input of mixer 51.

Control frequency generator 52 is connected through amplifier 53 to one input of mixer 54, through isolation network 56, to transmitting antennas 49 and through phase delay 50 to antenna 48. The output of amplifier 42 is connected to another input of mixer 51 and another input of mixer 54. The output of mixer 51 is connected through 150 c.p.s. rejection filter 57 to one input of phase discriminator 58. Ninety c.p.s. amplifier 59 is connected to another input of phase discriminator 58, the output of which is connected to a control input of control frequency generator 44.

The output of mixer 54 is connected through 90 c.p.s. rejection filter 61 to one input of phase discriminator 62. The output of 150 c.p.s. reference generator 63 is connected to another input of phase discriminator 62 which, in turn, is connected to a control input of control frequency generator 52. 150 c.p.s. amplifier 63 and 90 c.p.s. amplifier 59 extract the fifth and third harmonics, respectively, from the output of 30 c.p.s. reference generator 64 to provide related 150 c.p.s. and 90 c.p.s. signals.

Figure 4:
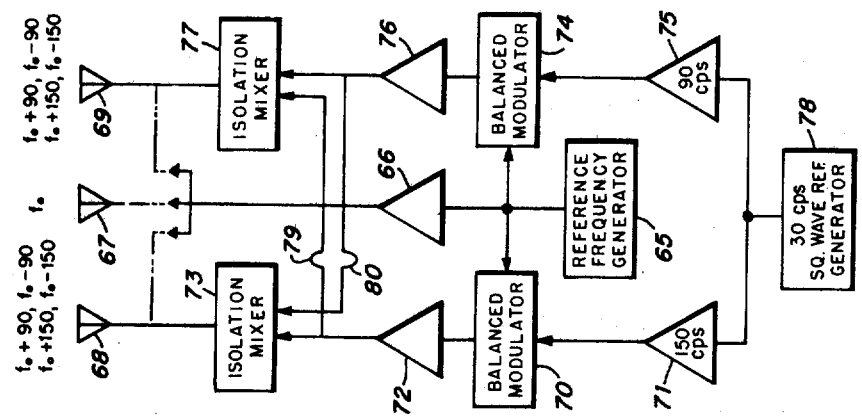
FIG. 4 is a block diagram of still another embodiment of the present invention.

Referring to FIG. 4, reference frequency generator 65 is connected through amplifier 66 to antenna 67, or alternately duplexed to antenna 68 or antenna 69. Reference frequency generator 65 also supplies a reference frequency to balanced modulator 70 and balanced modulator 74. Balanced modulator 70 is modulated by the output of 150 c.p.s. amplifier 71 and supplies 150 c.p.s. upper and lower sidebands, with suppressed carrier, to amplifier 72. Balanced modulator 74 is modulated by 90 c.p.s. amplifier 75 and supplies 90 c.p.s. upper and lower sidebands with suppressed carrier to amplifier 76. Amplifiers 71 and 75 supply related 150 c.p.s. and 90 c.p.s. signals by extracting the fifth and third harmonics, respectively, from the output of 30 c.p.s. square wave reference generator 78. The output of amplifier 72 is combined with the outut of amplier 76 through phase delay 80 in isolation mixer 73 and applied to antenna 68. The output of amplifier 72 is also combined through phase delay 79 with the output of amplifier 76 in isolation mixer 77 and applied to antenna 69.

Referring to FIG. 5, reference frequency generator 81 is connected through amplifier 82 to modulator amplifier 83 and to one input of mixers 84 and 86. The output of modulator amplifier 83 is connected to transmitting antenna 87. Control frequency generator 88 is connected through amplifier 89 to another input of mixer 86 and through isolation network 91 to transmitting antenna 92. The output of mixer 86 is connected through 90 c.p.s. rejection filter 93 to one input or phase discriminator 94 and through linear mixer 90 to modulator amplifier 83. Ninety c.p.s. amplifier 96 is connected to another input of phase discriminator 94, the output of which is connected to a control input of control frequency generator 89.

The output of control frequency generator 97 is connected through amplifier 98 to another input of mixer 84 and through phase delay 103 and isolation network 91 to transmitting antenna 92. The output of mixer 84 is connected through 150 c.p.s. rejection filter 99 to one input of phase discriminator 101. The output of 150 c.p.s. amplifier 102 is connected to another input of phase discriminator 101, the output of which is connected to the control input of control frequency generator 97. The output of 150 c.p.s. rejection filter 99 is also connected through another input of linear mixer 90 to a modulation input of modulator amplifier 83. 150 c.p.s. amplifier 102 and 90 c.p.s. amplifier 96 extract the fifth and third harmonics, respectively, of 30 c.p.s. square wave reference generator 85 to provide related 150 c.p.s. and 90 c.p.s. signals, respectively.

Figure 6:
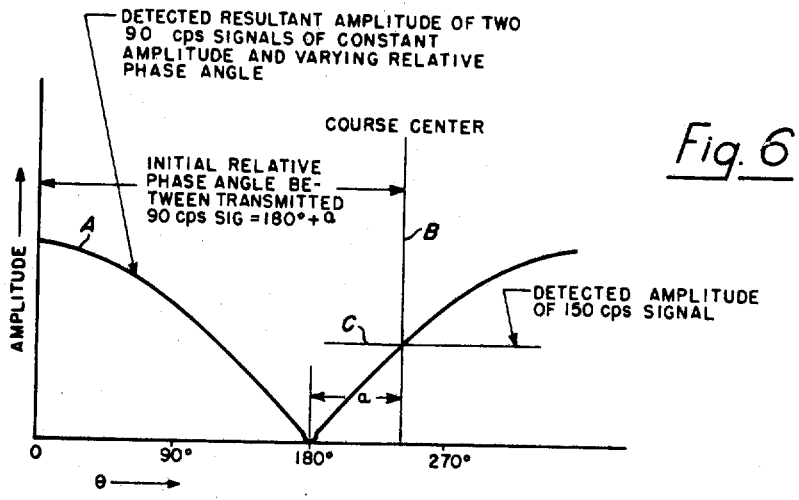
FIG. 6 is a graph showing the amplitude vs. phase angle relationship of the received composite signals from the embodiment of FIG. 2.

Referring to FIG. 6, amplitude is plotted vertically against relative phase angle at curve $a$ with phase angle $b$ and amplitudes are shown in dotted lines.

Figure 7:
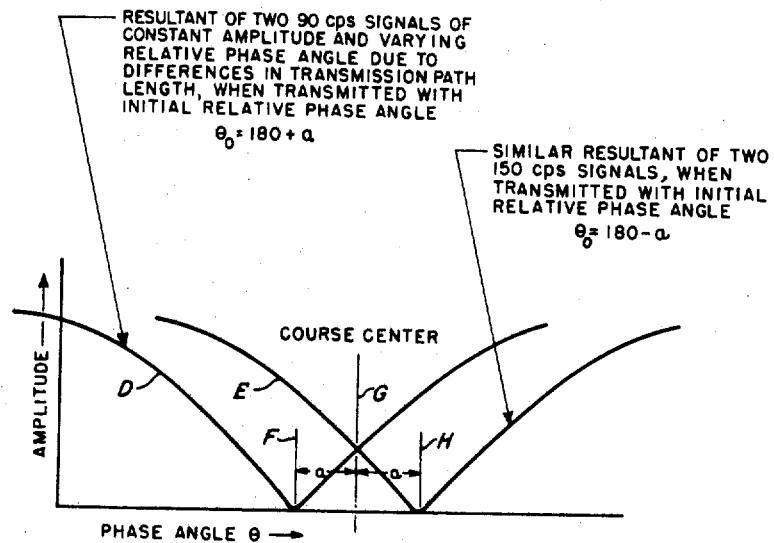
FIG. 7 is a graph showing the composite amplitudes vs. phase angle relationships of the signals received from the embodiments of FIGS. 3, 4 and 5.

Referring to FIG. 7, two curves $d$ and $e$ show the amplitudes of the resultant of pairs of signals plotted vertically against their relative phase angles plotted horizontally. Relative phase angles $f$, $g$, and $h$ are shown as vertical dotted lines.

Figure 8:
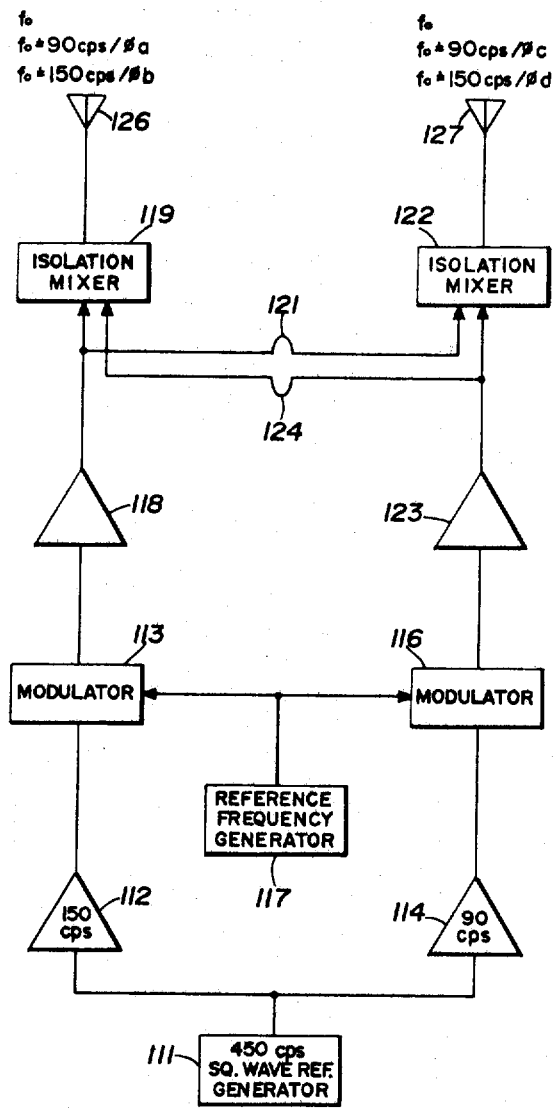
FIG. 8 is a block diagram of a further embodiment of the present invention.

Referring to FIG. 8, a 450 c.p.s. square wave reference generator 111 is coupled to 150 c.p.s. filter 112 to modulator 113 and through 90 c.p.s. filter 114 to modulator 116. Reference frequency generator 117 is coupled to modulators 113 and 116. The output of modulator 113 is coupled through amplifier 118 to isolation mixer 119 and through amplifier 118 and phase delay 121 to one input of isolation mixer 122. The output of modulator 116 is coupled through amplifier 123 to another input of isolation mixer 122 and through phase delay 124 to another input of isolation mixer 119. The output of isolation mixer 119 is coupled to transmitting antenna 126 and the output of isolation mixer 122 is coupled to transmitting antenna 127.

Operation

Referring back to FIG. 1, incoming signals at receiving antenna 11 are converted to an IF frequency at the output of converter 12, amplified in IF strip 13 detected by AM detector 14. The 90 cycle component at the output of detector 14 will then be passed by 90 cycle filter 16, rectified by rectifier 17 and applied to one side of differential DC meter 21. The 150 cycle component at the output of detector 14 is passed by 150 cycle filter 18, rectified in rectifier 19 and applied to the other side of output meter 21.

Referring to FIG. 2, reference frequency generator 23 at frequency $F_0$ is amplitude modulated by 150 c.p.s. amplifier 37 and radiated by antenna 26. This frequency $F_0$ is also applied to one input of mixer 27 which has as its other input an output from controlled frequency generator 28. These two signals are mixed, the difference of which is passed through 150 c.p.s. rejection (to remove any 150 cycle component from the modulation of reference frequency generator 23), and applied to one input of phase discriminator 34. The other input of phase discriminator 34 is supplied a 90 c.p.s. reference signal from amplifier 36. The output of phase discriminator 34 controls the frequency of control frequency generator 28. This servo loop is designed to yield a frequency $F_0$ plus 90 c.p.s. at the output of controlled frequency generator 28 to transmitting antennas 31 and 32. Should this frequency tend to deviate with respect to reference frequency generator 23, a different input from mixer 27 will be seen at discriminator 34 which will yield a controlled frequency generator 28 and reference frequency generator 23.

Three signals then will be radiated from antennas 26, 31 and 32, the reference frequency carrier which will carry a 150 c.p.s. amplitude modulation and two carriers 90 c.p.s. removed therefrom radiating from antennas 31 and 32.

At VOR receiver (FIG. 1) these three signals will combine, resulting in one output from detector 14 of the 150 c.p.s. modulated component from reference carrier $F_0$ being radiated by transmitting antenna 26. This reference intelligence will then be applied through 150 c.p.s. filter 18, rectified in rectifier 19 and applied to one side differential DC meter 21. Also present at the output of detector 14 will be two 90 c.p.s. signals. This will result from the combining of the reference frequency $F_0$ from transmitting antenna 26 and carrier frequency of $F_0$ plus 90 c.p.s. from transmitting antenna 31 and the combining of the reference frequency $F_0$ from transmitting antenna 26 and the signal transmitter from transmitting antenna 32 at a carrier frequency of $F_0$ plus 90 c.p.s. The 90 c.p.s. resultant from these two will have an amplitude dependent upon the relative phase of the two carriers being detected in detector 14 (see FIG. 6). Here it can be seen that the detected result and amplitude of the two 90 c.p.s. signals will vary as curve $a$ in FIG. 6 due to the fixed phase angle at transmission resulting in a variable detected phase due to the difference in transmission path lengths dependent upon the direction of the aircraft with respect to the antenna array. By setting the phase of antennas 26, 31 and 32 with respect to each other, the course center representing an on-course relative phase can be chosen as indicated by dotted line $b$ together with a detected amplitude of the 150 c.p.s. signal shown at dotted line $c$ which is constant regardless of the direction of the aircraft. The initial relative phase angle between the two 90 c.p.s. signals is represented by the distance between the point at which curve $a$ reaches zero amplitude in dotted line $b$. It is emphasized here that the positional error sensitivity of the information being displayed in the aircraft is not dependent upon amplitude patterns of the radiated signals; the only parameter will be the relative phase at receiving antenna 11 of the transmitted carriers.

Referring to FIG. 3, a modification of the embodiment of FIG. 2 is shown in which the reference frequency generator 41 is not modulated, but merely transmitted as a CW signal at the reference frequency $F_0$ from transmitting antenna 43, or coupled to antenna 48 or antenna 49 through switch arm 45. In this embodiment, two controlled frequency generators are utilized having an identical servo loop to that disclosed with reference to FIG. 2. Control frequency generator 44 generates a carrier frequency 90 c.p.s. removed from reference frequency $F_0$ which is transmitted by transmitting antennas 48 and 49. Control frequency generator 52 is 150 c.p.s. removed from reference carrier frequency $F_0$ and is also transmitted by transmitting antennas 48 and 49. The output of detector 14 will again see a 90 c.p.s. component, the relative amplitudes of each being determined by the relative phase of the carrier signals arriving at the receiving antenna 11. In this embodiment, the reference frequency $F_0$ from its transmitting antenna will first combine with the $F_0$ transmitting antenna to the receiving antenna 11. mitting antenna 48 which will yield 90 c.p.s. and 150 c.p.s. signals of fixed amplitude and a varying phase angle dependent upon the increase or decrease of transmission path length from antenna 48 to receiving antenna 11 relative to the transmission path length from the $F_0$ transmitting antenna to the receiving antenna 11. At the same time, the reference carrier frequency $F_0$ from its transmitting antenna will combine with the carriers at frequencies $F_0$ plus 90 and $F_0$ plus 150 which are transmitted from transmitting antenna 49. Again, the difference frequencies will have a constant amplitude at the output of detector 14 with a relative phase angle dependent upon the variation in relative phase of these carrier frequencies due to differential increase or decrease of transmission path length. The resultant 90 cycle component from the two combinings and the 150 cycle component from the two combinings will have relative amplitudes dependent upon the phases of the signals received at a receiving antenna 11 which again are dependent upon their phase relationship at transmission and the position of the aircraft relative to the transmitting antennas. Here it can be seen with reference to FIG. 7 that the course center $g$ can be set at the intersection of curves $d$ and $e$. Curve $d$ represents the resultant of the two 90 c.p.s. signals of constant amplitude with a varying relative phase angle which again is due to differences in transmission path length when transmitted with an initial relative phase angle. Curve $e$ is the similar resultant of the two 150 c.p.s. signals when transmitted with an initial relative phase angle. The relative phase angle of the 90 c.p.s. signal is represented by the distance between dotted lines $f$ and $g$ while the initial relative phase angle of the 150 c.p.s. signals is represented by the distance between dotted lines $g$ and $h$. Differential DC meter 18 again can be calibrated in terms of direction.

Referring to FIG. 4, the same action is accomplished as described for the embodiment illustrated in FIG. 3, the difference being that upper and lower sidebands of 90 c.p.s. and 150 c.p.s. offset frequencies are transmitted which encounter the same phase variations due to differences in path length, and provide substantially the same resultant outputs varying in amplitude as a function of relative phase.

Referring to FIG. 5, a further modification is shown in that only two transmitting antennas 87 and 92 need be utilized. Here the same three signals are developed, i.e., a reference carrier $F_0$ is developed by reference frequency generator 81, a carrier offset by 90 c.p.s. is developed by control frequency generator 88, and a frequency offset by 150 c.p.s. is developed by control frequency generator 97 in the same manner as they were developed in the embodiment described with respect to FIG. 3. Here, however, the reference frequency carrier $F_0$ is amplitude modulated by both the 90 c.p.s. frequency and the 150 c.p.s. frequency in modulator amplifier 83. Transmitting antenna 87 then radiates a reference frequency carrier $F_0$ which is amplitude modulated by both 90 c.p.s. and 150 c.p.s. Transmitting antenna 92 radiates both deviation frequencies, i.e., $F_0$ plus 90 c.p.s. and $F_0$ plus 150 c.p.s. The output of detector 14 (FIG. 1) will again have two components, a 90 c.p.s. and a 150 c.p.s. component. The 90 cycle component will be the resultant of the demodulation of the amplitude modulated reference carrier $F_0$ combined with the difference frequency of the reference carrier $F_0$ and $F_0$ plus 90 c.p.s. The resultant amplitude will depend again on the relative phase between the two carriers $F_0$ and $F_0$ plus 90 c.p.s. The 150 c.p.s. component will be the resultant of the combining of the demodulated 150 c.p.s. signal from the reference carrier $F_0$ and the difference frequency between the reference carrier $F_0$ and the carrier $F_0$ plus 150 c.p.s. FIG. 7 illustrates these two relationships. The resultant amplitude will again be dependent upon the relative phase between the reference carrier $F_0$ and the carrier $F_0$ plus 150 c.p.s. at receiving antenna 11. It can be seen that the relative amplitudes between the 90 c.p.s. and the 150 c.p.s. components at the output of detector 14 which will determine the absolute deflection of differential DC meter 21, will be totally dependent upon the phase relationship of the signals received at receiving antenna 11 rather than being derived from amplitude patterns of antenna arrays.

Another difference between the embodiment illustrated in FIG. 2 and those illustrated in FIGS. 3, 4 and 5 is that in the first case a resultant signal of varying amplitude is caused to be compared with a signal of fixed amplitude, while in the other cases a signal of varying amplitude is caused to be compared with another signal varying in the opposite fashion through the control region to provide a sensitivity twice that provided in the first case.

Referring back to FIG. 8, a further embodiment is shown in which conventional amplitude modulators 113 and 116 replace the balanced modulators utilized in the embodiment of FIG. 4. Another modification lies in the use of a subharmonic generator which is the 450 cycle per second square wave reference generator 111 in place of a 30 c.p.s. harmonic generator. This results in a more uniform amplitude of the 90 and 150 cycle modulations. In utilizing conventional amplitude modulators, the reference frequency, i.e., carrier frequency $F_0$, is then placed directly through the modulators on antennas 126 and 127 in addition to the 90 cycle per second sideband being directly coupled to antenna 127 and through phase delay 124 to antenna 126 resulting in a fixed phase relationship in these upper and lower sidebands and, likewise, the 150 c.p.s. sideband is coupled directly to antenna 126 and through phase delay 121 to antenna 127, again resulting in a fixed phase relationship between the 150 cycle upper and lower sidebands. This is illustrated by the legend at antenna 126 of frequencies $F_0$, $F_0$ plus and minus 90 c.p.s./phase A and $F_0$ plus and minus 150 c.p.s./phase B and the legend at antenna 127 of signals $F_0$, $F_0$ plus and minus 90 c.p.s./phase C and $F_0$ plus and minus 150 c.p.s./phase D.

It should be understood, of course, that the foregoing disclosure relates to only a preferred embodiment of the invention and that it is intended to cover all changes and modifications of the examples of the invention herein chosen for the purposes of the disclosure which do not constitute departures from the spirit and scope of the invention.

I claim:
1. An instrument landing system for utilization with an aircraft navigation receiver being tuned to receive a carrier frequency and having first and second output channels for first and second output frequencies comprising:
   first and second transmitting antennas in spatial relationship;
   a first transmitting means generating a signal having a frequency removed from said carrier frequency by said first output channel frequency, said first transmitter coupled to said first antenna, a phase delay means coupling said first transmitting means to said second antenna;
   second transmitting means generating a frequency removed from said carrier frequency by said second output channel frequency, said second transmitting means coupled to said second antenna means and a second phase delay means coupling said second transmitting means to said first antenna means; and
   a third transmiting means transmitting only said carrier frequency.

2. The instrument landing system of claim 1 wherein said third transmitting means is coupled to a third antenna in spatial relationship to said first and second antennas.

3. An instrument landing system for utilization with an aircraft navigation receiver being tuned to receive a carrier frequency and having first and second output channels for first and second output frequencies comprising:
   first and second transmitting antennas in spatial relationship;
   a first transmitting means generating signals having a frequency of said carrier frequency plus said first channel output frequency and said carrier frequency minus said first channel output frequency, said first transmitter coupled to said first transmitting antenna and a phase delay means coupling said first transmitter to said second transmitting antenna;
   second transmitting means generating signals having frequencies of said carrier frequency plus said second output channel frequency and said carrier frequency minus said second output channel frequency, said second transmitter coupled to said second transmitting antenna and a second phase delay means coupling said second transmitter to said first transmitting antenna; and a third transmitting means transmitting only said carrier frequency.

4. The instrument landing system of claim 3 wherein said third transmitting means is coupled to a third transmitting antenna in spatial relationship to said first and second transmitting antennas.

5. The instrument landing system of claim 1 wherein: said third transmitting means is coupled to at least one of said first and second transmitting antennas.

6. The instrument landing system of claim 1 wherein: said third transmitting means is coupled to each of said first and second transmitting antennas.

7. The instrument landing system of claim 3 wherein: said third transmitting means is coupled to at least one of said first and second transmitting antennas.

8. The instrument landing system of claim 3 wherein: said third transmitting means is coupled to each of said first and second transmitting antennas.

References Cited

UNITED STATES PATENTS

| | | | |
|---|---|---|---|
| 2,040,400 | 7/1946 | Pickles | 343—109 |
| 2,406,735 | 9/1946 | Alford | 343—109 |
| 2,412,986 | 12/1946 | Himmel | 343—109 |
| 2,557,855 | 6/1951 | Aicardi | 343—109 X |
| 3,111,671 | 11/1963 | Thompson | 343—105 X |

RODNEY D. BENNETT, Jr., Primary Examiner

HERBERT C. WAMSLEY, Assistant Examiner

U.S. Cl. X.R.

343—109